US008238721B2

(12) United States Patent
Braun et al.

(10) Patent No.: US 8,238,721 B2
(45) Date of Patent: Aug. 7, 2012

(54) SCENE CHANGING IN VIDEO PLAYBACK DEVICES INCLUDING DEVICE-GENERATED TRANSITIONS

(75) Inventors: Jeffrey Braun, Orinda, CA (US); Zane Vella, San Francisco, CA (US); Ole Lütjens, San Francisco, CA (US); Joe Rice, Oakland, CA (US); Tomonari Tohara, Foster City, CA (US)

(73) Assignee: Hollinbeck Mgmt. GmbH, LLC, Wilmington, DE (US)

( * ) Notice: Subject to any disclaimer, the term of this patent is extended or adjusted under 35 U.S.C. 154(b) by 855 days.

(21) Appl. No.: 11/011,494

(22) Filed: Dec. 14, 2004

(65) Prior Publication Data
US 2005/0191041 A1 Sep. 1, 2005

Related U.S. Application Data

(63) Continuation-in-part of application No. 10/924,745, filed on Aug. 23, 2004.

(60) Provisional application No. 60/548,207, filed on Feb. 27, 2004.

(51) Int. Cl.
*H04N 5/93* (2006.01)
(52) U.S. Cl. ...................................................... 386/280
(58) Field of Classification Search .............. 386/52, 386/55, 1, 46, 95
See application file for complete search history.

(56) References Cited

U.S. PATENT DOCUMENTS

| 4,975,771 | A | | 12/1990 | Kassatly |
| 5,060,087 | A | * | 10/1991 | Nishijima et al. ............. 386/53 |
| 5,218,672 | A | * | 6/1993 | Morgan et al. ................ 345/501 |
| 5,404,295 | A | | 4/1995 | Katz et al. |
| 5,734,862 | A | | 3/1998 | Kulas |
| 5,850,545 | A | | 12/1998 | Matsushita |
| 5,895,124 | A | | 4/1999 | Tsuga et al. |
| 5,913,010 | A | | 6/1999 | Kaneshige et al. |
| 5,923,627 | A | | 7/1999 | Miwa et al. |
| 5,929,857 | A | | 7/1999 | Dinallo et al. |
| 5,963,256 | A | | 10/1999 | Tahara |

(Continued)

FOREIGN PATENT DOCUMENTS

EP 0 785 675 7/1997

(Continued)

OTHER PUBLICATIONS

Author: H.Kodikara Arachchi and W.A.C. Fernando Title: An intelligent rate control algorithm to improve the video quality at scene transitions for off-line MPEG-1/2 encoders Date: Feb. 2003 Publisher: IEEE. Volume: IEEE Transactions on Consumer Electronics, vol. 49, No. 1. pp. 210-219.*

(Continued)

*Primary Examiner* — William C Vaughn, Jr.
*Assistant Examiner* — Tat Chio
(74) *Attorney, Agent, or Firm* — Knobbe, Martens, Olson & Bear LLP

(57) ABSTRACT

A video playback device automatically generates transition indications when a user selects a new video stream while a current video stream is playing. Transitions can be any visual and/or audio indication including a wipe, fade, title overlay, graphics overlay, etc. Predetermined default transitions are associated with different transition types or a user can create and associate transitions to be used. Different types of transitions include a scene change, angle change, exit to a control menu, etc.

46 Claims, 3 Drawing Sheets

U.S. PATENT DOCUMENTS

| | | | | |
|---|---|---|---|---|
| 5,999,698 A | * | 12/1999 | Nakai et al. | 386/125 |
| 6,006,241 A | | 12/1999 | Purnaveja et al. | |
| 6,085,185 A | | 7/2000 | Matsuzawa et al. | |
| 6,088,506 A | | 7/2000 | Yoshio et al. | |
| 6,105,063 A | | 8/2000 | Hayes, Jr. | |
| 6,173,287 B1 | | 1/2001 | Eberman et al. | |
| 6,173,317 B1 | | 1/2001 | Chaddha et al. | |
| 6,175,595 B1 | | 1/2001 | Keesman | |
| 6,245,982 B1 | | 6/2001 | Suzuki et al. | |
| 6,246,401 B1 | | 6/2001 | Setogawa et al. | |
| 6,256,453 B1 | | 7/2001 | Takano | |
| 6,263,346 B1 | | 7/2001 | Rodriquez | |
| 6,289,165 B1 | | 9/2001 | Abecassis | |
| 6,307,550 B1 | | 10/2001 | Chen et al. | |
| 6,332,144 B1 | | 12/2001 | deVries et al. | |
| 6,404,925 B1 | | 6/2002 | Foote et al. | |
| 6,430,361 B2 | | 8/2002 | Lee | |
| 6,430,609 B1 | | 8/2002 | Dewhurst et al. | |
| 6,434,097 B1 | | 8/2002 | Lewis et al. | |
| 6,449,653 B2 | | 9/2002 | Klemets et al. | |
| 6,453,459 B1 | | 9/2002 | Brodersen et al. | |
| 6,467,080 B1 | | 10/2002 | Devine et al. | |
| 6,477,315 B1 | * | 11/2002 | Ohomori | 386/55 |
| 6,483,983 B1 | | 11/2002 | Takahashi et al. | |
| 6,501,770 B2 | | 12/2002 | Arsenault et al. | |
| 6,529,246 B1 | * | 3/2003 | Maeda | 348/570 |
| 6,546,405 B2 | | 4/2003 | Gupta et al. | |
| 6,687,211 B2 | | 2/2004 | Sawabe et al. | |
| 6,731,185 B2 | | 5/2004 | Taniguchi | |
| 6,789,109 B2 | | 9/2004 | Samra et al. | |
| 6,806,885 B1 | | 10/2004 | Piper et al. | |
| 6,898,799 B1 | * | 5/2005 | Jarman | 725/25 |
| 6,954,419 B1 | | 10/2005 | Kimura et al. | |
| 6,954,581 B2 | * | 10/2005 | Miller et al. | 386/52 |
| 6,965,723 B1 | * | 11/2005 | Abe et al. | 386/55 |
| 6,985,188 B1 | | 1/2006 | Hurst, Jr. | |
| 7,009,658 B2 | | 3/2006 | Kim | |
| 7,061,930 B2 | | 6/2006 | Mizobata | |
| 7,079,752 B1 | | 7/2006 | Leyendecker | |
| 7,151,214 B2 | | 12/2006 | Barry | |
| 7,161,079 B2 | | 1/2007 | Nishitani et al. | |
| 7,334,026 B2 | | 2/2008 | Samra et al. | |
| 7,565,060 B2 | | 7/2009 | Hamada et al. | |
| 2001/0033736 A1 | | 10/2001 | Yap et al. | |
| 2002/0032768 A1 | | 3/2002 | Voskuil | |
| 2002/0092021 A1 | | 7/2002 | Yap et al. | |
| 2003/0191776 A1 | | 10/2003 | Obrador | |
| 2003/0236581 A1 | | 12/2003 | Chambers et al. | |
| 2004/0073930 A1 | | 4/2004 | Demas et al. | |
| 2004/0078215 A1 | | 4/2004 | Dahlin et al. | |
| 2004/0107439 A1 | | 6/2004 | Hassell et al. | |
| 2004/0181592 A1 | | 9/2004 | Samra et al. | |
| 2004/0184768 A1 | | 9/2004 | Seo et al. | |
| 2004/0201544 A1 | | 10/2004 | Love et al. | |
| 2005/0111829 A1 | | 5/2005 | Ito et al. | |
| 2005/0234958 A1 | | 10/2005 | Sipusic et al. | |
| 2005/0262542 A1 | | 11/2005 | DeWeese et al. | |

FOREIGN PATENT DOCUMENTS

JP    07210174    8/1995

OTHER PUBLICATIONS

Bargeron, et al. "Annotations for Streaming Video on the Web", CHI '99 Extended Abstracts on Human Factors in Computing Systems, ACM Press, published 1999, pp. 278-279.

* cited by examiner

SCENE CHANGING IN VIDEO PLAYBACK DEVICES INCLUDING DEVICE-GENERATED TRANSITIONS

CLAIM OF PRIORITY

This invention is a Continuation-in-Part of U.S. patent application Ser. No. 10/924,745 filed on Aug. 23, 2004 which is hereby incorporated by reference as if set forth in full in this document. This invention claims priority to U.S. Provisional Patent Application Ser. No. 60/548,207 filed on Feb. 27, 2004.

BACKGROUND OF THE INVENTION

This invention relates in general to digital systems and more specifically to a system and method for allowing fast angle or scene changing in playback of video productions such as digital versatile disc (DVD) playback devices.

Today's video playback systems often provide several new features. One feature, called "multi-angle," allows a user to select a desired camera angle from which to view a currently displayed scene. For example, if a user is watching a music video and the user would like a close-up of the singer, instead of the currently presented medium shot, the user can depress a button on a remote control device and select the singer's close-up angle. A user can select a different scene or shot, entirely, such as requesting that a view of a guitar player, rather than the singer, be displayed.

Any number and type of angle (or other scene selections) can be made as long as they are within the performance ability of the video playback system and as long as they are provided by the video content. Additional content, such as audio, menu, sub-picture or other information, can also be the subject of angle or scene changes. For example, in the case where a user selects a shot of the guitar player, the audio track can be changed so that the guitar sound is louder in the audio mix.

Typically, today's playback systems limit the number of possible angles that can be selected by a user at any point in time. For example, up to 9 different angles are provided in a standard DVD-Video specification published by the DVD Format/Logo Licensing Corporation, entitled "DVD Specifications for Read-Only Disc/Part 3: Video Specifications, Version 1.13" that is hereby incorporated by reference as if set forth in full in this specification.

Another limitation of today's playback systems is that the angle switch is not instantaneous. Typically there can be anywhere from one-half to 6 seconds, or so, of delay after a user makes an angle change selection until the selected angle actually appears on a display screen.

This delay is due to a number of factors. One factor is the time required to "flush" or update various buffers and other components in the playback system to remove data relating to the deselected track and fill the buffers with data relating to the selected track. Depending on the speed of the system, and the number and size of the buffers, the updating of buffers can take several seconds.

Another factor in the delay is that the video information on the DVD is stored in compressed form, and includes other associated data (e.g., parity, error correction, channel assignment, header information, etc.). The DVD data must be decompressed, or decoded, and the associated data may require additional processing before the video information is made available in a format that is fit for display. The delay due to decoding and other processing can typically be about one-half of a second.

Another drawback of angle or scene changes is that it is often difficult for a user to tell if a scene change or edit was caused by a user's selection or was part of a cut or edit that is part of the presentation. I.e., an edit made during post-production that is part of the movie or video.

SUMMARY OF THE INVENTION

Embodiments of the present invention provide for scene change transitions to be generated at a playback device such as a DVD player. When a user input causes a scene change (whether a fast angle change or otherwise) a transition effect such as a wipe, fade, lap dissolve, etc., is performed at or around the time of switching scenes or streams. Transitions can be preprogrammed default transitions or can be selected by a user. Transitions can be generated dynamically at any point in the switching of video streams, or at other points during playback.

Transitions can be designated by a DVD content editor at the time of authoring a DVD. These authored transitions are used to instruct the playback device to perform the transition at the time of playback and can also be modified by a user, or other source, if desired.

One embodiment uses different transitions for different types of selections. For example, if a production uses three different camera angles then selection of each angle can be by a color-coded wipe such as red for angle 1, white for angle 2 and green for angle 3. Any other type of transition variation or indication can be used. For example, a fade can be used for angle 1, interleave for angle 2, computer graphics effect for angle 3, etc. Another type of distinction can be whether the user is selecting a scene or angle change versus going to a menu, or other control selection.

DETAILED DESCRIPTION OF PREFERRED EMBODIMENTS

A system for performing fast angle switching is described followed by a description of device-generated transitions. Note that the device-generated transitions feature can be performed with any type of angle or scene changing approach, whether using the fast angle switching described herein or not.

Two basic fast angle switching embodiments are presented. In each embodiment, data for multiple streams (e.g., multi-angle, scene branching, etc.) of video are read from a DVD disc or other content source. In a first embodiment, each separate stream's data is sent to a demultiplexer for sorting and storing in a buffer for later selection and presentation to a decoder and ultimately to a display device. Thus, in this first embodiment, data for each stream is assembled in sequence in a buffer. In a second embodiment, although data for each stream is still read from the DVD and provided to a demultiplexer, the demultiplexer only provides a currently single stream to be buffered, decoded and displayed.

Figure 1:
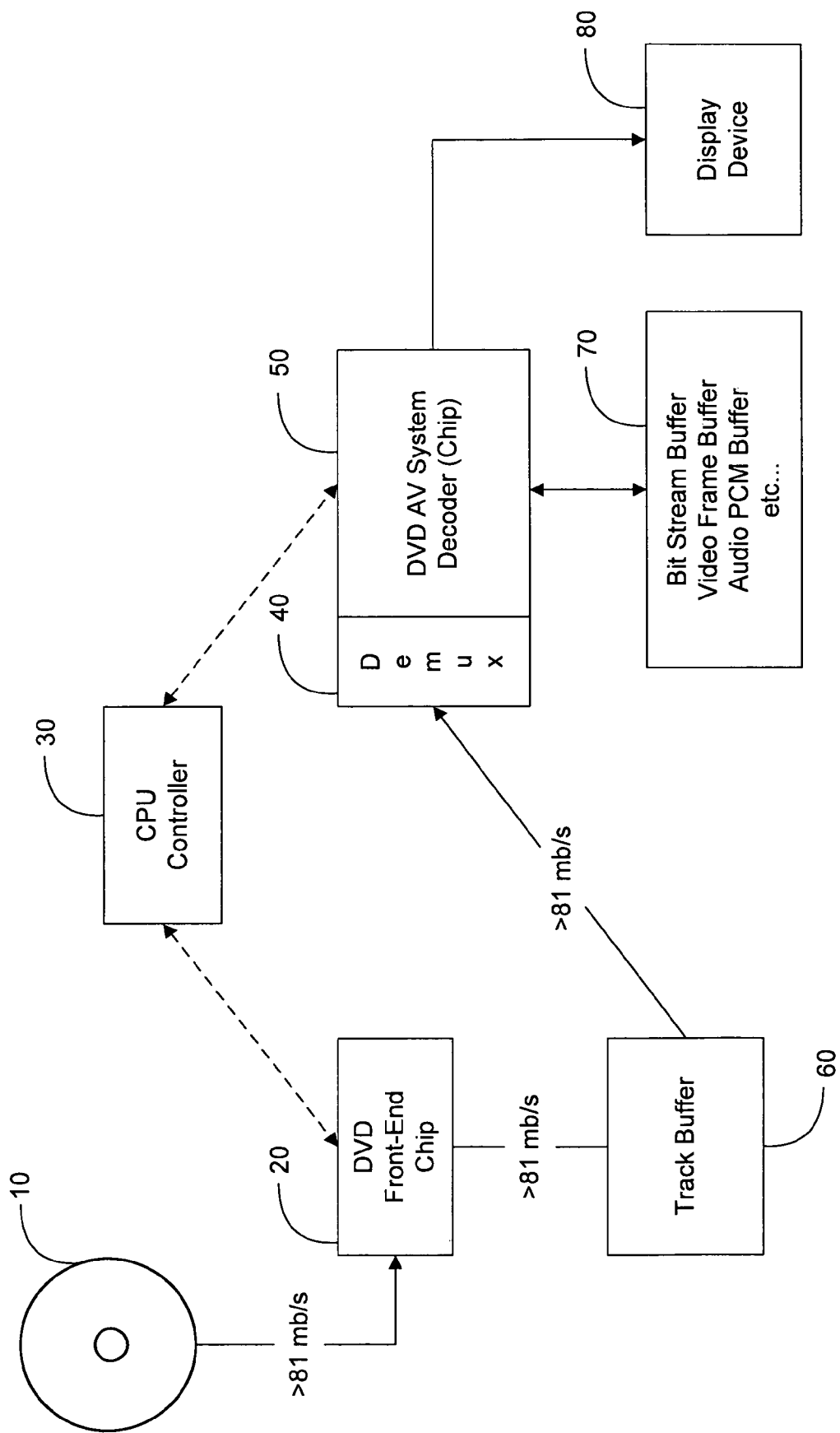
FIG. 1 shows a simplified diagram of a DVD playback system.

FIG. 1 shows a basic diagram of a DVD playback process. In FIG. 1, DVD 10 provides content information to front-end chip 20: The content can include video, audio and sub-picture bit streams. Controller 30 (e.g., a processor or central processing unit (CPU)) directs which streams are to be used when multiple audio or sub-picture streams are present. Front end chip 20 provides the content information to track buffer 60 which is accessed by demultiplexer 40. Demultiplexer 40 can work with other hardware, software or functionality such as decoder 50 and buffers 70 to prepare the information in a format suitable for display device 80. Note that FIG. 1 is intended to show one possible configuration of components or functions in a DVD playback device. Many variations are possible, such as adding, omitting or changing the selection and arrangement of items shown in FIG. 1. Specific components, arrangements, data flow and functions are discussed below and can also be changed to suit a particular design.

Figure 2:
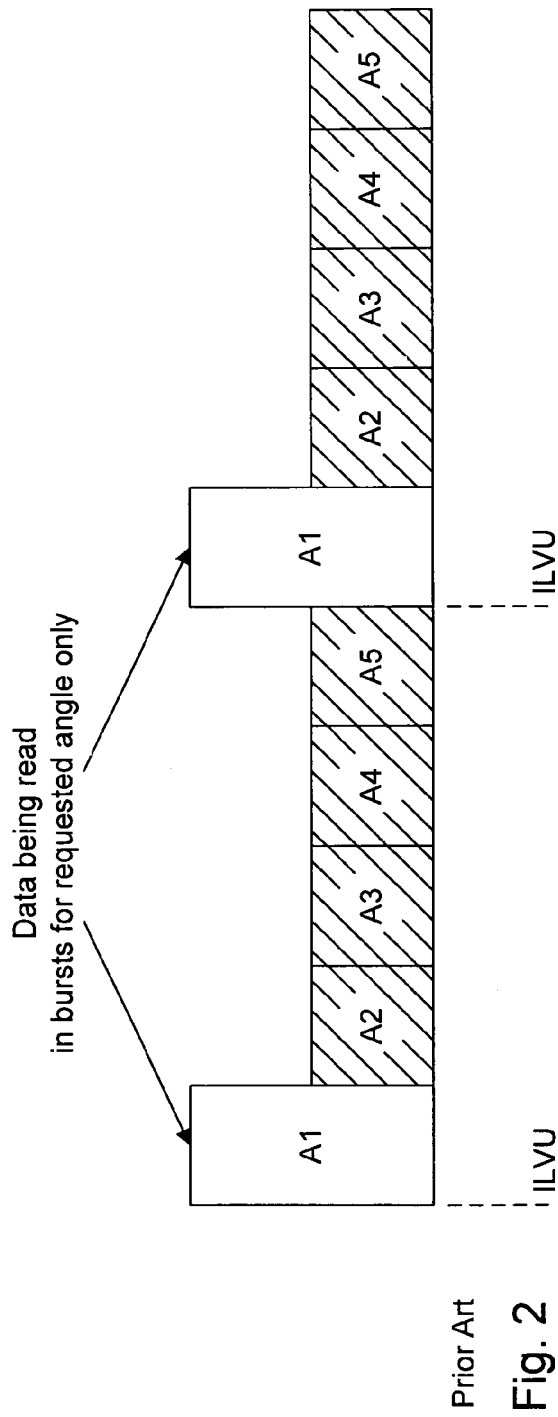
FIG. 2 is an example of traditional reading of data from a DVD.

FIG. 2 illustrates data for multiple angles residing on a DVD. Data for each angle is designated as A1, A2, A3, A4 and A5 for angles 1 through 5, respectively. Each angle is associated with a "block" of data that exists in each sequential Interleaved Video Unit (ILVU). Although the data is sequential on the DVD, only the data for a currently selected single stream, in this case A1, is read by the front end chip 20.

Figure 3:
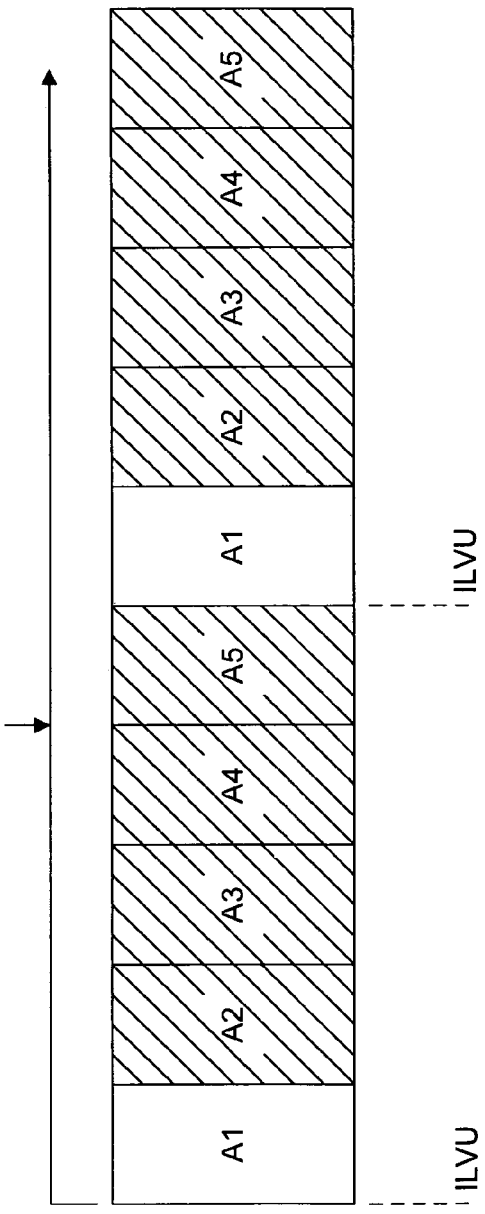
FIG. 3 illustrates reading of data from a DVD according to embodiments of the invention.

FIG. 3 contrasts the DVD read approach of the present invention where all data from all blocks is read sequentially from the DVD and provided to the front end chip. Note that other embodiments may choose to read less than all of the blocks (e.g., blocks from two or more streams).

Figure 4:
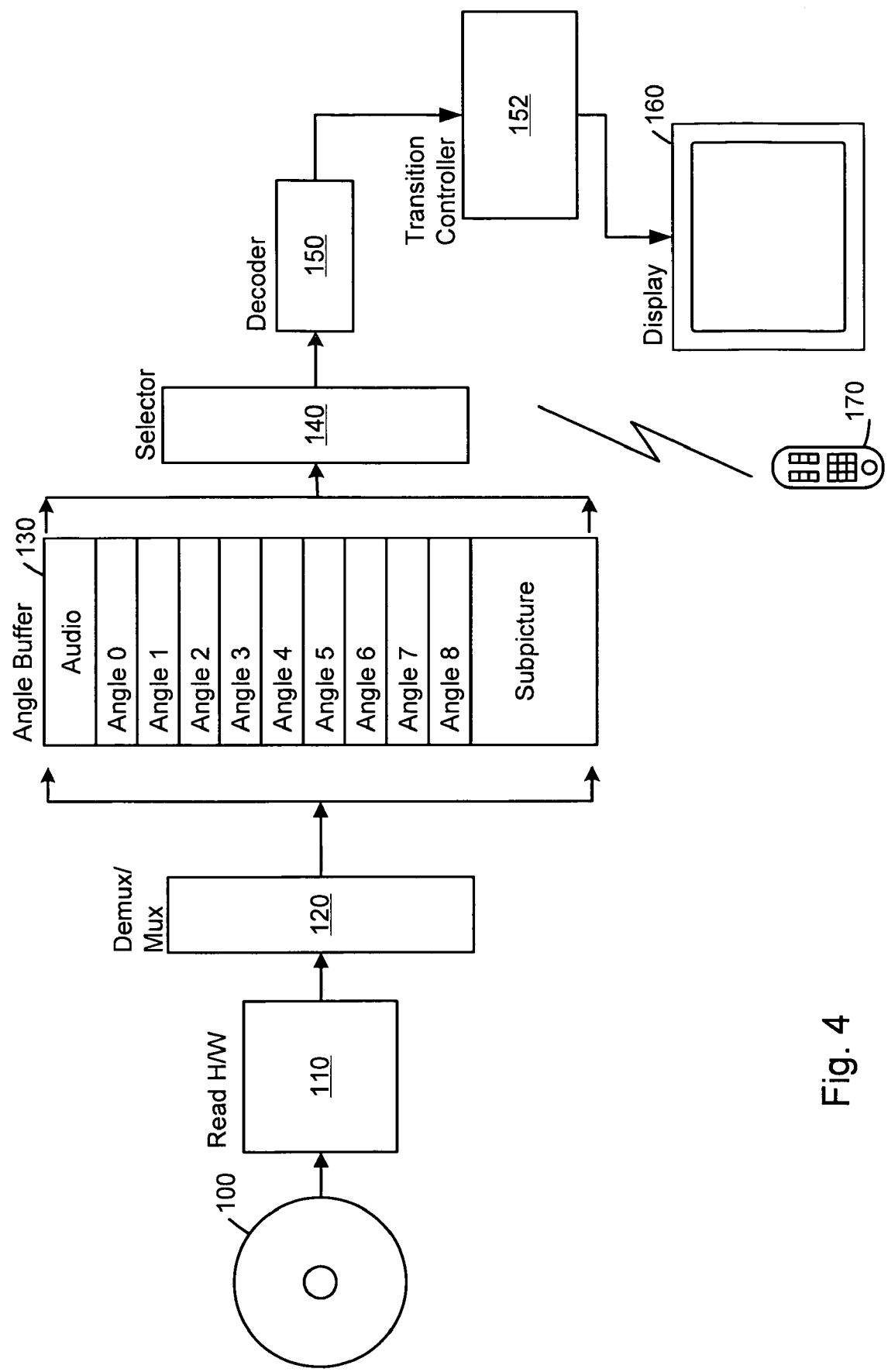
FIG. 4 is a simplified block diagram of a preferred embodiment showing video stream channels stored in a buffer for selected provision to a decoder.

FIG. 4 illustrates a preferred, first embodiment of the invention. FIG. 2, is a simplified block diagram including some components of a DVD player design. Note that many other designs are possible and some components are omitted for ease of discussion. In other embodiments, some components of FIG. 2 can be omitted or changed.

In FIG. 2, DVD 100 includes video stream data for multiple angles, or scenes, as is known in the art. For example, one standard physical format is in accordance with DVD specifications as described, above. In general, any format, standard or specification for providing a data stream having multiple selectable streams, or channels, can be used with the present invention. Read hardware 110 includes detection mechanisms (e.g., a laser read head), buffers, processors and other components or devices for obtaining the information from the DVD in a digital form.

Note that although the present invention is directed to DVD applications that any other source of video or image information can be acceptable. For example, a compact disc (CD) read-only memory (CDROM), hard disk drive, solid state memory, digital network (including satellite, digital subscriber line (DSL), cable), etc. can be a source for video information.

Demux/Mux 120 includes circuitry to detect different streams from the video stream source (in this case DVD 100 and read hardware 110) and segregate the information into separate video streams. In a preferred embodiment, a DVD playback system is designed to process video data compressed according to a Motion Picture Experts Group (MPEG) standard, with interleaving and other format characteristics as specified in the DVD standards described above, and in related DVD specifications published by the same standards body. In the present standard, up to 9 different video streams, audio and subpicture information can be obtained from the DVD.

Demux/Mux 120 can include any type of circuitry or process for performing stream information segregation. In a preferred embodiment, a demultiplexer is used to separate the different interleaved blocks and a multiplexer is used to direct blocks belonging to a specific stream, or channel, to a predetermined location in stream buffer 130.

The video streams, audio and subpicture information are segregated into different areas in stream buffer 130. Note that stream buffer 130 can be one or more separate blocks of memory, chips, systems, etc. It is not strictly necessary to place all information into a single physical buffer, but a typical design may realize benefits of speed, lower manufacturing cost and simplicity of design by using a single buffer. Any number of channels can be accommodated. In FIG. 2, the application is a multi-angle switching application so that each channel, or stream, is labeled with an angle number as "Angle 0," "Angle 1," . . . "Angle 8."

Channels may have associated other data such as an audio track or subpicture information. This associated data can be unique to each channel in which case the associated data can be segregated into one or more areas in the stream buffer, similarly to the channel information. Or, as shown in FIG. 2, If data is common to two or more channels it can be included in a separate area of the buffer. In either approach, data structures or circuitry (e.g., tables, pointers, indexes, etc.) can be used to associate specific parts of the associated data with different channels.

At the output of stream buffer 130 is selector 140. Selector circuitry is responsive to a signal from a user input device, such as remote control 170, to direct specific stream or channel information from stream buffer 130 to the input of decoder 150. Decoder 150 can be a standard DVD decoder for decompressing the channel information into image information for display 160. In a preferred embodiment, selector 140 includes a demultiplexer for selecting a portion of the stream buffer for output to the decoder. Note that different approaches to the design of FIG. 2 can be equally effective. Some or all of the functions can be performed by hardware or software, as desired.

A second embodiment uses a demultiplexer with additional functionality. The demultiplexer is provided with multiple streams' data, as before, but the demultiplexer sends only the data for a current stream (i.e., the stream being viewed) to the track or angle buffer (or other buffer). This approach may have an advantage in that more of a standard DVD player's hardware can be used without modification.

This approach can utilize intelligence in the demultiplexer to filter the desired angle data to the decoder from a high-rate input stream combining all angle data. An enlarged track buffer feeds the demultiplexer at a rate of at least n*r, where n is the number of angles and r is the data rate of a single angle's bitstream. This embodiment may take advantage of existing back-end chipsets with programmable demultiplexers allowing for implementation without back-end hardware modifications.

Typically, a demultiplexer works at the "pack level" of data. Packs can include video, audio, subpicture, navigation packets and other data. Thus, there may not be defining characteristics in a video pack that declare to which angle the pack data belongs. In such cases, a modification can be made to either the pack or packet header of the data source (e.g., to the DVD data). Each header allows for a non-zero amount of stuffing, or padding data. The first byte of this padding data could be used to designate the angle number the pack or packet belongs to, allowing the demultiplexer to identify the stream's context on the fly. For a DVD source this modification can be done during the authoring stage, using a customized authoring or multiplexing tool. Additional details on pack structure can be found in, e.g., DVD Specifications for Read-Only Disc/Part 3 v1.1, sec. V15.

In a preferred embodiment, the demultiplexer is assured of having access to the next requested angle at the next "Group of Pictures" (GOP) boundary in order to prevent decoder video input buffer underflow. This may require data transfer between the track buffer and demultiplexer at higher than n*r immediately following a new angle requests. It is possible to add greater intelligence to the front-end in order to parse the data and eliminate redundant data (such as audio and subpicture packs which are replicated among all angles) and/or to re-interleave data at the pack level to shorten distance between data belonging to any particular angle.

Transition controller 152 receives decoded streams from decoder 150. When a stream is switched from a currently viewed stream to a new stream, the transition controller can selectively generate a visual effect such as a wipe, fade, cross-fade, or other visual effect. Alphanumeric characters or graphics can be used as an overlay, cutscene, or combined with the stream information or video. Characteristics of the video can be adjusted as part of the transition effect. For example, the hue, saturation or tint can be modified temporarily. The dimensions of the video can be changed. Any other characteristics such as the contrast, sharpness, etc., can be modified. Standard features such as picture-in-picture, split-screen, etc., can be employed.

A transition can also include audio. Audio that is part of the video stream can be modified. For example, the audio volume can be changed. Other manipulable audio characteristics can be modified including equalization, compression, etc. Audio effects can be added such as reverberation, echo, delay, filtering, etc. A transition can include audio that is not part of the original stream so that new sounds can be included in a transition. In general, the invention contemplates that any type of visual and/or audio information can be used as part of a transition.

The transition controller can be informed of a switch from a current stream to a new stream by a signal provided by selector 140, decoder 150, remote control 170, or any other component or signal source within, or local to, the playback device. In a preferred embodiment, the transition controller is provided with a signal from the selector that indicates a channel number associated with the new stream. The channel number is obtained from information encoded in the video stream according to the standards described above.

The transition controller can use a different transition corresponding to a channel number of the new stream. For example, if the channels are designated 1, 2 and 3, then a transition can include a brief display of the corresponding numeral. Or a wipe effect using a color associated with each channel number can be used. Or different types of visual or audio cues can be used in a transition in association with each channel number.

Transitions can be programmed at the time of manufacture of the device. Multiple pre-made transitions can be supplied and a user can select the associations to make among the different possible channels (i.e., angles, scenes, etc.). Other options are possible such as allowing a user to create their own transitions out of component effects. For example, a user can select text to be used for different transitions. A user can operate a computer system to generate transitions from a post-production application and load the transitions into the playback device. Transitions can be obtained from a network such as the Internet and downloaded into the playback device. Both transition definitions and transition assignments to channels can be obtained from third-party sources. For example, a DVD can include transition information and channel assignments for the playback of the production on the DVD.

Transition indicators can be used to trigger a transition effect during playback of a DVD or other video stream. This differs from traditional transition playback in that the transition itself is not included in the video and audio information of the video stream content. Rather, a transition indicator such as digital data in the form of a command value, header or block value, etc., can be included and used by a playback device to look up, or trigger, the presentation of a transition.

The transition indicator can be included in the stream itself or it can be included or stored in any other data area or hardware component in the playback medium (e.g., a DVD, video CD, etc.) or in the playback device (e.g., RAM, ROM, obtained from a network connection or external data source, etc.) The initial transition indicator or value can be defined and inserted by an editor or author of a production at the time of creation of the production, manufacture of a DVD, or at any other time prior to a user's playback of the production. The indicator can be changed after the time of creation of a video medium or after the time of defining and sending a video stream. The indicator can be changed by a user or automatically or manually by any other entity such as by obtaining transition indicators from a network, storage medium, etc. For example, an advertisement obtained from a network connection can be caused to be inserted in transitions that take a non-negligible amount of time.

Although the invention has been described with reference to specific embodiments thereof, these embodiments are merely illustrative, and not restrictive, of the invention. For example, although embodiments of the invention has been discussed primarily with respect to a DVD medium, any other type of media or source of audio tracks can be used to equal advantage. A storage medium can include magnetic, optical, memory, etc. Embodiments of the invention can be used with a streaming audio source such as from a satellite, cable television network, telephone modem, or Internet or other digital network system or communication channel. Sources of content can be combined. For example, a transition can occur between a stream from a DVD and a stream from the Internet. Any digital transmission system, format, encoding, encryption or compression approaches can be used with the present invention. Any suitable system, other than the systems described herein, can be used to create transitions. For example, a system using chips manufactured by Zoran, Inc., which allow multiple standard definition or a high-definition stream can be used.

Although a user input device is a preferred way of obtaining an angle change selection, other embodiments may use other triggers for an angle change selection. For example, a change selection or other command or input can be automatically generated by a device, obtained from a network or other data source, or obtained in other ways. Other embodiments can also use multiple decoders so that multiple streams are decoded simultaneously by different decoders. It may also be possible to use multiple decoders on a single stream as where different decoders process different pieces of a buffered stream. Other variations are possible.

Any suitable programming language can be used to implement the routines of the present invention including C, C++, Java, assembly language, etc. Different programming techniques can be employed such as procedural or object oriented. The routines can execute on a single processing device or multiple processors. Although the steps, operations or computations may be presented in a specific order, this order may be changed in different embodiments. In some embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A "computer-readable medium" or "machine-readable medium" for purposes of embodiments of the present invention may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory.

A "processor" or "process" includes any human, hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. Although specific media (e.g., DVD, CD, CDROM) may be discussed, any type of machine-readable media can be used.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Embodiments of the invention may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of the present invention can be achieved by any means as is known in the art. Distributed, or networked systems, components and circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

Although specific examples of standard or prior art hardware have been described, embodiments of the invention can be adapted for use with any suitable hardware including variations from the standard hardware, or future playback devices.

The scope of the invention is to be determined solely by the appended claims.

What is claimed is:

1. A method for of transitioning between video stream via a video playback device, the method comprising:
   receiving a digital video disk (DVD) including a video production in the video playback device;
   using the video playback device to play back a current video stream stored on the DVD;
   accepting a signal from a user input device to select a new video stream stored on the DVD during playback of the current video stream;

receiving and storing a visual transition provided by or downloaded by a user;

in response to the signal to select the new video stream stored on the DVD during playback of the current video stream providing for display, using the video playback device, the visual transition to indicate the start of playback of the new video stream; and outputting the visual transition at a playback time for the video production during a transition from the current stream to the new video stream, the visual transition not including content from the current video stream and the new video stream as stored on the DVD at the playback time when the visual transition is output, so that in response to the signal to select the new video stream, the visual transition is presented to the user.

2. The method of claim 1, wherein the transition includes audio.

3. The method of claim 1, wherein the visual transition provided by or downloaded by the user includes one or more of text or graphics.

4. The method of claim 1, further comprising predetermining one or more types of transitions in association with one or more types of user selections.

5. The method of claim 1, further comprising accepting a user input to associate a type of transition with a type of user selection.

6. The method of claim 1, wherein a video stream is obtained from an optical medium.

7. The method of claim 6, wherein the video playback device includes a DVD player.

8. The method of claim 1, wherein the video playback device includes a CD player.

9. The method of claim 1, wherein a video stream is obtained from a magnetic medium.

10. The method of claim 9, wherein the magnetic medium includes a hard disk.

11. The method of claim 1, wherein a video stream is obtained at least in part from a cable network.

12. The method of claim 1, wherein a video stream is obtained at least in part from a satellite network.

13. The method of claim 1, wherein a video stream is obtained at least in part from the internet.

14. The method of claim 1, wherein the current video stream is for a first angle of the video production and the new video stream is for a second angle of the video production.

15. The method of claim 1, wherein the information output for the visual transition is not included in the DVD.

16. An apparatus configured to manage a transition between video streams, the apparatus comprising:

a video playback device, including at least hardware, configured to:

receive a digital video disk (DVD) including a video production in the video playback device, and play back a current video stream stored on the DVD;

a detector configured to determine when a user has made a selection for playback of a new video steam stored on the DVD during playback of the current video stream; and a transition generator, included in the video playback device configured to: receive and store a visual transition provided by or downloaded by a user;

respond to a signal from the detector indicating the user has made the selection for playback of the new video stream stored on the DVD during playback of the current video stream, by providing for display the visual transition to indicate a start of playback of the new video stream and output the visual transition at a playback time for the video production during a transition from the current stream to the new video stream, the visual transition not including content from the current video stream and the video stream as stored on the DVD.

17. The apparatus of claim 16, wherein the transition generator is configured to temporarily modify at least one of hue, saturation, tint, contrast, sharpness, to provide the visual transition in response to the signal to indicate the start of playback of the new video stream.

18. The apparatus of claim 16, wherein the transition generator is configured to temporarily modify video dimensions to provide the visual transition in response to the signal to indicate the start of playback of the new video stream.

19. The apparatus of claim 16, wherein the transition generator is configured to modify audio from the DVD in response to the signal to indicate the start of playback of the new video stream.

20. The apparatus of claim 16, wherein the transition generator is configured to provide audio not included in the DVD in response to the signal to indicate the start of playback of the new video stream.

21. A method of transiting between video streams via a video playback device, the method comprising:

receiving and storing a visual transition provided by or downloaded by a user;

receiving a video content, wherein the video content is from a first source;

playing a current video stream included in the video content;

receiving a signal from a user input device to select a new video stream from the first source from the video content during playing of the current video stream;

in response to the signal, providing the visual transition at the video playback device for display during the transition from playing the current video stream from the first source to playing the new video stream from the first source, wherein the visual transition does not include content from the received video content from the first source, so that in response to the signal select that new video stream, the visual transition is presented to the user.

22. The method of claim 21, further comprising providing, in response to the signal from the user input device selecting the new video stream, audio indicating the transition in conjunction with the visual transition displayed.

23. The method of claim 21, wherein the generated visual transition displayed in response to the signal from the user input device selecting the new video stream includes one or more of text or graphics.

24. The method of claim 21, further comprising receiving a user selection of at least one visual transition that is to be provided for display during the transition from playing the current video stream to playing the new video stream.

25. The method of claim 21, further comprising receiving a user input indicating an association of a type of transition with a type of user selection.

26. The method of claim 21, wherein the video content is obtained from an optical medium.

27. The method of claim 21, wherein the first source is a DVD or a CD.

28. The method of claim 21, wherein a video content is obtained from a magnetic medium.

29. The method of claim 21, wherein a video content is obtained at least in part from a cable network.

30. The method of claim 21, wherein a video content is obtained at least in part from a satellite network.

31. The method of claim 21, wherein a video content is obtained at least in part from the internet.

32. The method of claim 21, wherein the visual transition is provided in response to the signal at least in part by temporarily modifying at least one of hue, saturation, tint, contrast, sharpness, to indicate the start of playback of the new video stream.

33. The method of claim 21, wherein the visual transition is provided in response to the signal at least in part by temporarily modifying video dimensions to provide the visual transition to indicate the start of playback of the new video stream.

34. The method of claim 21, the method further comprising modifying audio associated with the video content to indicate the start of playback of the new video stream.

35. The method of claim 21, wherein the transition generator is configured to provide audio not included in the DVD in response to the signal to indicate the start of playback of the new video stream.

36. The method of claim 21, wherein the current video stream is for a first visual angle the new video stream is for a second visual angle.

37. A tangible, non-transitory computer-readable medium having computer-executable instructions stored thereon that, if executed by a computing device, cause the computing device to perform operations comprising:
receiving and storing a visual transition provided by or downloaded by a user;
during playing of a current video stream, receiving a signal from a user input device to select a new video stream from video content received from a first source,
wherein the first source video content includes multiple video stream;
and
in response to the signal from the user input device, providing the visual transition for display during a transition from playing the current video stream from the first source to playing the new stream from the first source,
wherein the visual transition does not include content from the received video content from the first source, so that in response to the signal to select that new video stream, the visual transition is presented to the user.

38. The tangible computer-readable medium of claim 37, wherein the operations further comprises providing audio indicating the transition in conjunction with the visual transition.

39. The tangible computer-readable medium of claim 37, wherein the visual transition provided for display in response to the signal from the user input device selecting the new video stream includes one or more of text or graphics.

40. The tangible computer-readable medium of claim 37, wherein the operations further comprises receiving a user selection of at least one visual transition that is to be provided for display during the transition from playing the current video stream to playing the new video stream.

41. The tangible computer-readable medium of claim 37, wherein the operations further comprises obtaining the video content from an optical medium and/or a magnetic medium.

42. The tangible computer-readable medium of claim 37, wherein the operations further comprises obtaining the video content at least partly from a cable network and/or satellite network.

43. The tangible computer-readable medium of claim 37, wherein the operations further comprises obtaining the video content at least partly from the Internet.

44. The tangible computer-readable medium of claim 37, wherein the visual transition provided for display in response to the signal from the user input device selecting the new video stream is provided at least in part by temporarily modifying at least one of hue, saturation, tint, contrast, sharpness, to indicate the start of playback of the new video stream.

45. The tangible computer-readable medium of claim 37, wherein the visual transition provided for display in response to the signal from the user input device selecting the new video stream is provided at least in part by temporarily modifying video dimensions to provide the visual transition to indicate the start of playback of the new video stream.

46. The tangible computer-readable medium of claim 37, wherein the current video stream is for a first visual angle the new video stream is for a second visual angle.

* * * * *

UNITED STATES PATENT AND TRADEMARK OFFICE
CERTIFICATE OF CORRECTION

| | | |
|---|---|---|
| PATENT NO. | : 8,238,721 B2 | Page 1 of 1 |
| APPLICATION NO. | : 11/011494 | |
| DATED | : August 7, 2012 | |
| INVENTOR(S) | : Braun et al. | |

It is certified that error appears in the above-identified patent and that said Letters Patent is hereby corrected as shown below:

In Column 8, Line 59, in Claim 1, delete "for of" and insert -- of --, therefor.

In Column 9, Line 58, in Claim 16, delete "steam" and insert -- stream --, therefor.

In Column 10, Line 23, in Claim 21, delete "transiting" and insert -- transitioning --, therefor.

Signed and Sealed this
Fifteenth Day of January, 2013

David J. Kappos
*Director of the United States Patent and Trademark Office*